US012717565B2

(12) United States Patent
Atar et al.

(10) Patent No.: US 12,717,565 B2
(45) Date of Patent: Aug. 25, 2026

(54) SYSTEM, METHOD, AND COMPUTER PROGRAM FOR UNIFIED DEPLOYMENT OF MICROSEVICES

(71) Applicant: Amdocs Development Limited, Limassol (CY)

(72) Inventors: Tehila Atar, Tushia (IL); Ian Klein, Hatfield (GB); Ofek Ben Arie, Hod Hasharon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 279 days.

(21) Appl. No.: 18/587,675

(22) Filed: Feb. 26, 2024

(65) Prior Publication Data

US 2025/0272077 A1 Aug. 28, 2025

(51) Int. Cl.

| | |
|---|---|
| ***G06F 8/61*** | (2018.01) |
| ***G06F 8/41*** | (2018.01) |
| ***G06F 8/60*** | (2018.01) |
| ***G06F 8/75*** | (2018.01) |
| ***G06F 9/4401*** | (2018.01) |
| ***G06F 9/54*** | (2006.01) |

(52) U.S. Cl.

CPC .................................... *G06F 8/60* (2013.01)

(58) Field of Classification Search

CPC .......... G06F 8/60; G06F 9/45558; G06F 8/51; G06F 9/5077; G06F 9/45504; G06F 8/31; G06F 9/455; G06F 8/65; G06F 11/1469; G06F 11/1464; G06F 21/60; G06F 9/542; G06F 11/1461; G06F 11/0754; G06F 11/302; G06F 9/5072; G06F 9/45533; G06F 8/76; G06F 8/40; G06F 9/22; G06F 8/30; G06F 8/72; G06F 9/547; G06F 9/4403; G06F 8/61; G06F 8/63

See application file for complete search history.

(56) References Cited

U.S. PATENT DOCUMENTS

| | | | | |
|---|---|---|---|---|
| 10,892,960 | B1 | 1/2021 | Emelyanov et al. | |
| 12,079,606 | B2 * | 9/2024 | Boorstin | G06Q 20/389 |
| 12,086,606 | B2 * | 9/2024 | Singhal | G06F 9/45533 |
| 2020/0351368 | A1 * | 11/2020 | Walsh | G06F 9/547 |
| 2020/0356400 | A1 * | 11/2020 | Pashenkov | G06F 9/547 |
| 2022/0236978 | A1 | 7/2022 | Yu | |
| 2022/0385542 | A1 * | 12/2022 | Gokan Khan | H04L 41/0895 |
| 2023/0127037 | A1 * | 4/2023 | Waite | G06F 8/61 717/175 |
| 2024/0241764 | A1 * | 7/2024 | Jha | G06F 9/5072 |
| 2025/0007796 | A1 * | 1/2025 | Smith | H04L 41/0806 |

OTHER PUBLICATIONS

Richardson et al., Microservices From Design to Deployment, 80 pages (Year: 2016).*

(Continued)

*Primary Examiner* — Thuy Dao

(74) *Attorney, Agent, or Firm* — Zilka-Kotab, P.C.

(57) ABSTRACT

As described herein, a system, method, and computer program are provided for unifying deployment of microservices. A plurality of microservices to be deployed to a system are determined. Deployments of the plurality of microservices are unified into a single deployment of the plurality of microservices to the system.

16 Claims, 5 Drawing Sheets

100

(56) References Cited

OTHER PUBLICATIONS

O'Reilly, "Chapter 4. Multi-Container Pods," O'Reilly Media, Inc., 2024, 18 pages, retrieved from https://www.oreilly.com/library/view/certified-kubernetes-application/9781492083726/ch04.html.

Kubernetes, "Communicate Between Containers in the Same Pod Using a Shared Volume," Kubernetes Documentation, Aug. 24, 2023, 3 pages, retrieved from https://kubernetes.io/docs/tasks/access-application-cluster/communicate-containers-same-pod-shared-volume/.

Chase, N., "Kubernetes multi-container pods and container communication," Mirantis, Feb. 9, 2022, 18 pages, retrieved from https://www.mirantis.com/blog/multi-container-pods-and-container-communication-in-kubernetes.

Fernandez et al., "5 Options for Deploying Microservices," Semaphore, 2024, 22 pages, retrieved from https://semaphoreci.com/blog/deploy-microservices.

Spring, "Spring Modulith," Spring, 2024, 4 pages, retrieved from https://spring.io/projects/spring-modulith#overview.

Drotbohm, O., "Introducing Spring Modulith," Spring, Oct. 21, 2022, 17 pages, retrieved from https://spring.io/blog/2022/10/21/introducing-spring-modulith.

International Search Report and Written Opinion from PCT Application No. PCT/IB2025/051946, dated May 12, 2025, 10 pages.

* cited by examiner

SYSTEM, METHOD, AND COMPUTER PROGRAM FOR UNIFIED DEPLOYMENT OF MICROSEVICES

FIELD OF THE INVENTION

The present invention relates to microservice deployments.

BACKGROUND

Microservices refer to independently developed services which can be used with one another to form an application. The microservices can fulfill different functionality requirements of the application, and will generally communicate with one another via well-fined application programming interfaces (APIs). The microservices are deployed on a system having computer resources (e.g. processors, memory, etc.) that support execution of the microservices.

The system will accordingly consist of many microservices, with each microservice requiring a minimal resources footprint in order to operate properly. Further, in a production environment, each microservice requires at least a minimum of two replicas in order to fulfill high availability requirements. Most of the microservices on a system will use the same third parties and shared libraries which contribute to the resources footprint as well.

Unfortunately, the system startup time and resources usage are proportional to the number of microservice deployments. Not only does it take significant resources to deploy an environment, but to process a global change requires restarting many deployments.

There is thus a need for addressing these and/or other issues associated with the prior art. For example, there is a need to unify microservice deployments, which can reduce the hardware resources required to run such microservices as well as reduce the communication latency such microservices.

SUMMARY

As described herein, a system, method, and computer program are provided for unifying deployment of microservices. A plurality of microservices to be deployed to a system are determined. Deployments of the plurality of microservices are unified into a single deployment of the plurality of microservices to the system.

DETAILED DESCRIPTION

Figure 1:
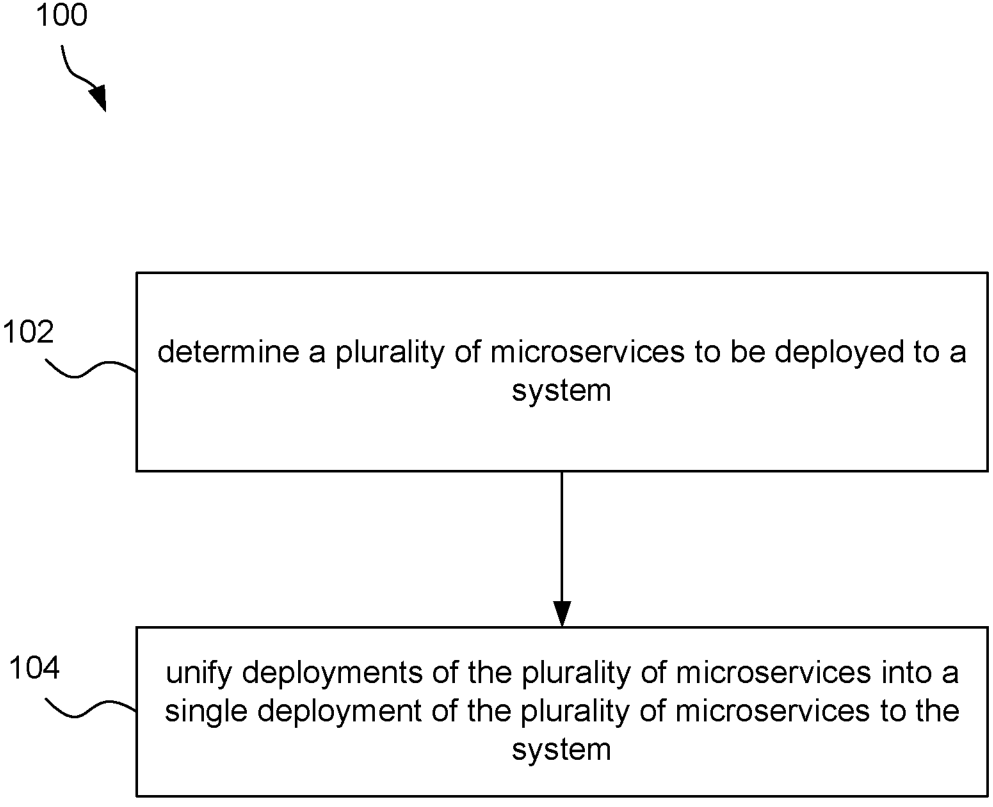
FIG. 1 illustrates a method for unifying deployment of microservices, in accordance with one embodiment.

FIG. 1 illustrates a method 100 for unifying deployment of microservices, in accordance with one embodiment. The method may be carried out by a computer system, such as that described below with respect to FIGS. 4 and/or 5.

In operation 102, a plurality of microservices to be deployed to a system are determined. The system refers to a computer system having hardware resources on which the microservices may run. For example, the system may include one or more services. In an embodiment, the system may be a sub-system of a larger computer system, such as a sub-system of a system executing the present method 100.

The microservices refer to independently developed services which can be used with one another, in a desired combination, to form an application. The microservices are configured to run on the system to provide some defined functionality. The microservices include APIs through which the microservices can communicate with one another.

As mentioned, the microservices are to be deployed to the system. Thus, a collection of microservices ready to be deployed to the system may be determined. The microservices may be intended to operate in combination to form the application, in an embodiment. In another embodiment, the microservices may not necessarily be intended to operate in combination to form a single application.

In operation 104, deployments of the plurality of microservices are unified into a single deployment of the plurality of microservices to the system. Deployment of the microservices to the system refers to downloading, installing, or otherwise placing the microservice, along with any required components of the microservice, on the system. Traditionally, each of the microservices would be individually deployed to the system. However, the present operation 104 unifies those deployments into a single deployment of the plurality of microservices to the system.

In an embodiment, a discrete deployable artifact may be provided for each individual microservice of the plurality of microservices. In an embodiment, a single executable artifact may be provided for all of the plurality of microservices. Accordingly, the single deployment of the plurality of microservices may include both the discrete deployable artifact per microservice and the single executable artifact for all microservices.

Once the microservices are deployed, via the single deployment, to the system, startup of the system, including the microservices deployed thereto, may commence. In an embodiment, upon startup of the system, each microservice of the plurality of microservices may be loaded into an isolated context. In an embodiment, the isolated context may be provided for each microservice of the plurality of microservices with a related configuration and objects.

In an embodiment, the isolated context may provide database separation among the plurality of microservices. In an embodiment, the isolated context may enable independent continuous integration and development lifecycle for each microservice of the plurality of microservices. In an embodiment, the isolated context may enable elasticity for the plurality of microservices.

Once the system has started up, two or more of the microservices may communicate with one another to provide the functionality of the application. In an embodiment, in-process calls may be used for communications between the plurality of microservices (i.e. that were included in the same deployment). By using an in-process invocation method for microservice-to-microservice calls, serialization and network time may be reduced as compared to traditional remote calls.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
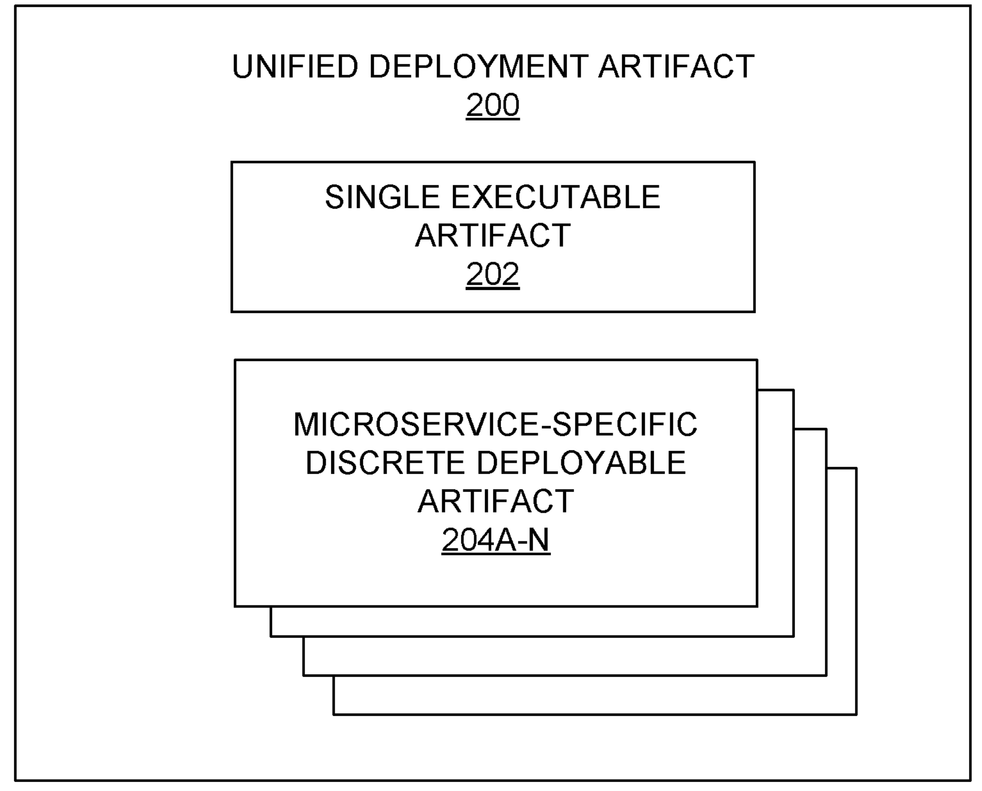
FIG. 2 illustrates a deployment artifact for a unifying deployment of a plurality of microservices, in accordance with one embodiment.

FIG. 2 illustrates a deployment artifact 200 for a unifying deployment of a plurality of microservices, in accordance with one embodiment. As an option, the deployment artifact 200 may be implemented in the context of the details of the previous figure and/or any subsequent figure(s). Of course, however, the deployment artifact 200 may be implemented in the context of any desired environment. Further, the aforementioned definitions may equally apply to the description below.

As shown, the deployment artifact 200 includes a single executable artifact 202 and a plurality of microservice-specific discrete deployable artifacts. The deployment artifact 200 can be deployed to a system to collectively deploy a plurality of microservices to the system.

The following description provides an exemplary implementation of the deployment artifact 200 in the context of Java Spring microservices deployed on Kubernetes (K8s) using Helm.

Terms

Inner microservices—Microservices included in a same deployment

Core microservice—Business microservice which is released by a core/product department In-Process customization microservice—Customization microservice which has hook implementations of a specific Core microservice. This customization microservice is deployed under a same associated core microservice and hooks are invoked via an in-process invocation method.

Spring Application Context—Spring Inversion of Control (IoC) container that is responsible for instantiating, configuring, and assembling the Spring beans Spring Application Context Hierarchy—Multiple Spring application contexts with a parent-child relationship. A context hierarchy allows multiple child contexts to share beans which exist in the parent context. Each child context can override configuration and beans inherited from the parent context.

Overview

On K8s, each application pod consists of (1) a single foundation executable runtime container and (2) application init containers which are a single container per each microservice which is loaded to the pod.

The pod is constructed at deploy time. Init containers may also be added for customization hooks implementation. When a microservice needs more scaling control, it can be split appropriately per customer and environment type.

At runtime, on startup, a Spring context hierarchy is used for creating a dedicated context per microservice in order to prevent configuration and beans registered in one microservice context from being accessible/overridden by another microservice.

Deployment

A dedicated plugin is created which merges the helm charts of all unified microservices into a single unified helm chart. This provides the flexible ability to deploy either the discrete chart or the unified chart.

A discrete init container is provided per microservice. This discrete init container includes a core microservice init image for the core microservice, and optionally an in-proc customization microservice init image for a hooks implementation if needed.

A single executable runtime container is provided for all microservices being collectively deployed.

This deployment takes advantage of the Kubernetes capability to form an executable pod comprised of several containers. The application code is run using an executable generic infrastructure container and another init container that contain the application code. The init container simply copies the application Jars to a shared folder in the pod where the generic container expects.

Kubernetes runs the init containers, and when it completes then it runs the generic container. The pod then runs exactly as if all were in the same container. Each microservice constructs an init container containing the application code. The init container uses a special infrastructure image (which includes a copy function) as a base.

Runtime

On startup, each microservice is loaded into an isolated context in order to avoid collisions with other microservices. Further, inner services communication is enabled. In particular, for microservice-to-microservice calls, in case both microservices are under the same deployment, an in-process invocation method is used in order to save serialization and network time.

In an embodiment, on startup, a Spring context hierarchy is used for creating a dedicated context per microservice in order to prevent configuration and beans registered in one microservice context from being accessible/overridden by another microservice. This facilitates the creation of loosely coupled microservices modules. The Spring application context hierarchy topology is described in FIG. 3 below.

Figure 3:
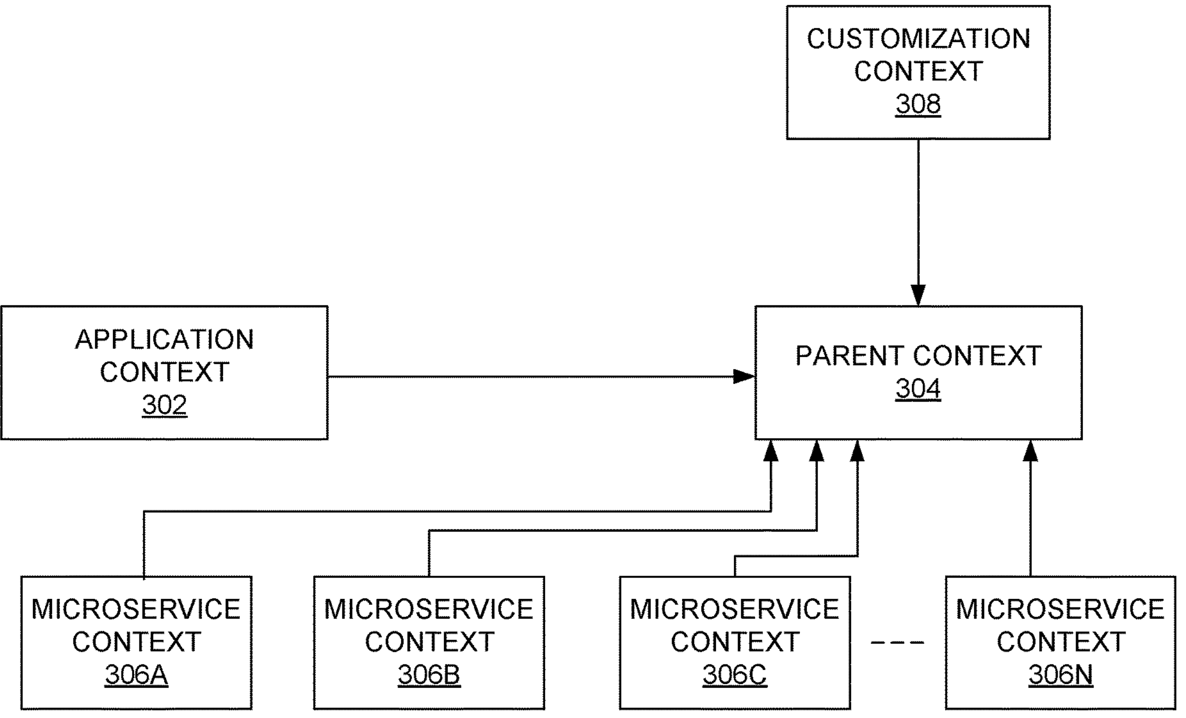
FIG. 3 illustrates a context hierarchy providing a dedicated context per microservice included in a unified microservice deployment, in accordance with one embodiment.

FIG. 3 illustrates a context hierarchy providing a dedicated context per microservice included in a unified microservice deployment, in accordance with one embodiment. The context hierarchy may be implemented in the context of the description of the Figures above.

As mentioned in the prior descriptions, on startup, a Spring context hierarchy is used for creating a dedicated context per microservice in order to prevent configuration and beans registered in one microservice context from being accessible/overridden by another microservice. This facilitates the creation of loosely coupled microservices modules.

The Spring application context hierarchy topology includes:

(1) A single parent application 304 (for common setup and configuration if needed).

(2) The following child application with siblings relation (which make each microservice context isolated from the other microservices):

(a) Dedicated non-web Spring application contexts is being created for each core microservice 306A-N;

(b) Dedicated non-web Spring application contexts is being created for each in-process customization microservice (if it exists) 308; and (c) Single spring web application context 302 is being created and the incoming requests are routed to the relevant application context.

For inner services communication, the exposed API controller bean of the target microservice is invoked directly.

Each microservice is built independently. During application boot, an application main module with booting capabilities will Spring Boot which in turn will load each microservice (init container) deployed to a specific location into a dedicated application context 302 using a spring application builder in order to build the desired context hierarchy.

For the context hierarchy, the parent context 304 may have multiple child contexts 306-308. A child context can access, override beans/configuration inherited from the parent context 304. The opposite direction is not enabled. A child context 306 cannot access/override beans from another child context.

Summary

The embodiments described above provide the following for unified microservice deployment:

Unified microservice deployment reduces the hardware (CPU, memory, network) required to deploy the microservices on the system. Resources requirements per deployment should be significantly less than the sum of per discrete microservice deployment. Unified microservice deployment also improves the operability by reducing the number of deployments.

Elasticity, microservice DB separation, independent CI and development lifecycle per microservice is further provided.

For customization use cases: customization logic is optimized such that it runs at the same process as the core process in order to reduce remote calls.

Pre and post exit points are provided for customization on desired Core APIs. Implementation of pre/post logic does not require changing of core code. This capability is added in addition to remote, out of processing customization.

The ability to test unified deployment as part of the single microservice build process is provided.

A performance improvement for service-to-service calls is provided—in case both services are on the same deployment, the serialization and network time of inner-microservices communication is reduced by invoking in-process calls instead of HTTP remote calls.

"Merging" to a unified deployment is supported also on single microservice build stage for testing purposes.

Side by side support is provided for multi and single deployment to allow flexibility of different deployment topologies per environment type and customer needs.

Figure 4:
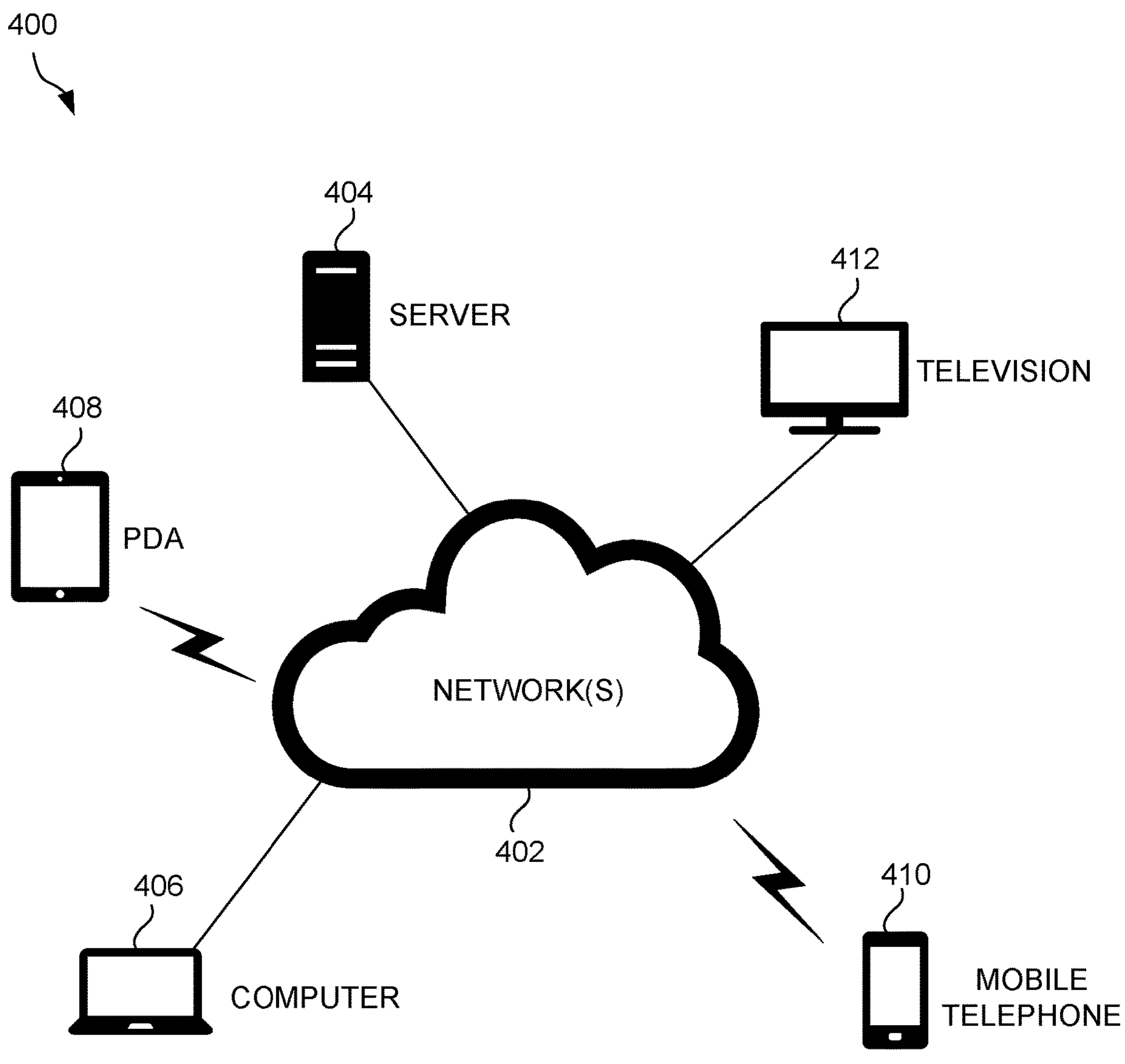
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
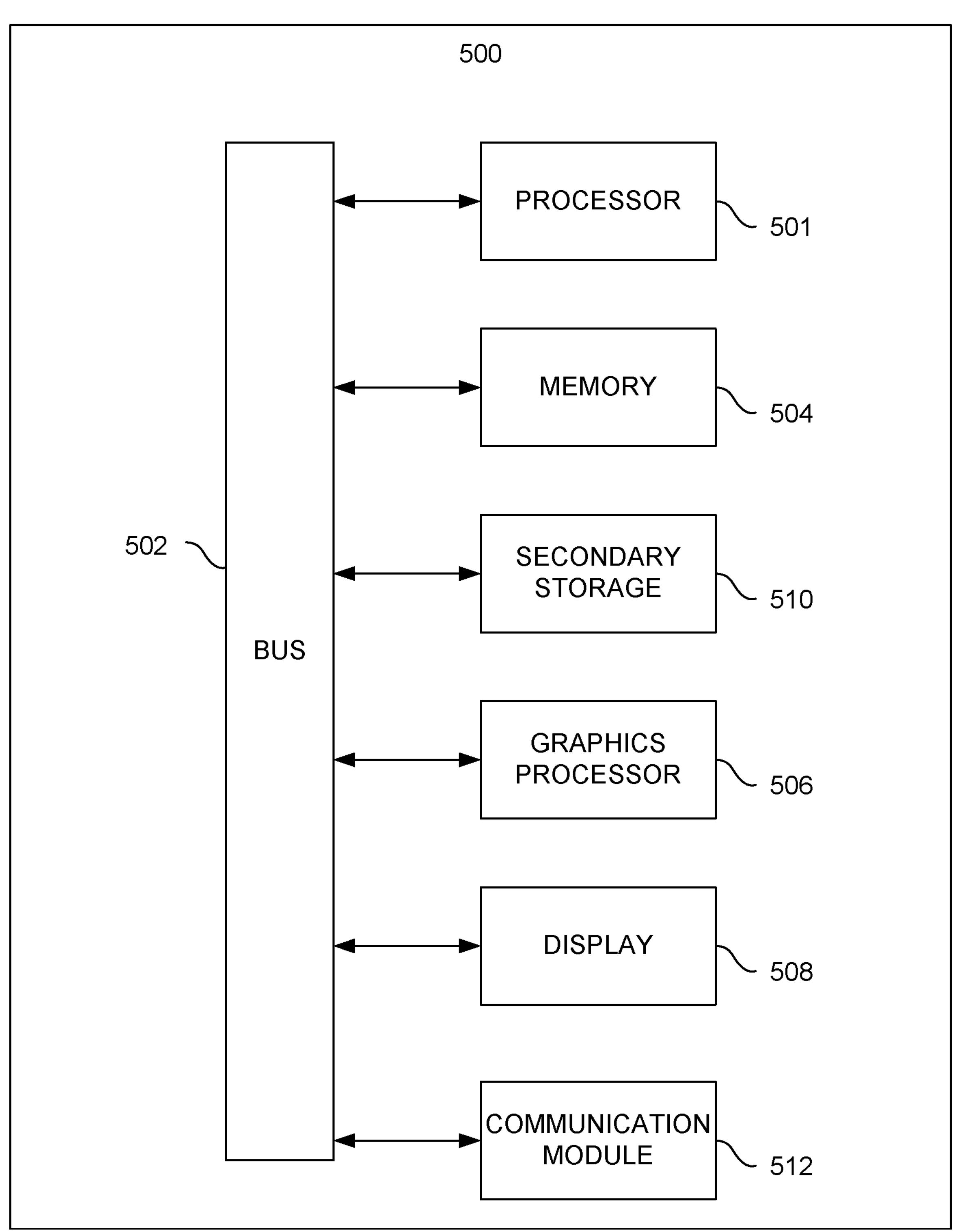
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
- determine a plurality of microservices to be deployed to a system;
- deploy the plurality of microservices to the system via a single unified deployment artifact, wherein the deployment of the plurality of microservices via the single unified deployment artifact causes:
  - installation of the plurality of microservices to the system, and
  - installation of required components of the plurality of microservices to the system;
- perform a startup of the system having the plurality of microservices installed thereon;
- upon startup of the system, load each microservice of the plurality of microservices into an isolated context; and
- for each microservice of the plurality of microservices, provide independent continuous integration and development lifecycle using the isolated context of the microservice.

2. The non-transitory computer-readable media of claim 1, wherein the single unified deployment artifact includes a discrete deployable artifact provided for each individual microservice of the plurality of microservices.

3. The non-transitory computer-readable media of claim 1, wherein the single unified deployment artifact includes a single executable artifact provided for all of the plurality of microservices.

4. The non-transitory computer-readable media of claim 1, wherein the isolated context is provided for each microservice of the plurality of microservices with a related configuration and objects.

5. The non-transitory computer-readable media of claim 1, wherein the isolated context provides database separation among the plurality of microservices.

6. The non-transitory computer-readable media of claim 1, wherein the isolated context enables elasticity for the plurality of microservices.

7. The non-transitory computer-readable media of claim 1, wherein in-process calls are used for communications between the plurality of microservices.

8. A method, comprising:
- at a computer system:
- determining a plurality of microservices to be deployed to a system;

deploying the plurality of microservices to the system via a single unified deployment artifact, wherein the deployment of the plurality of microservices via the single unified deployment artifact causes:

installation of the plurality of microservices to the system, and installation of required components of the plurality of microservices to the system;

performing a startup of the system having the plurality of microservices installed thereon;

upon startup of the system, loading each microservice of the plurality of microservices into an isolated context; and for each microservice of the plurality of microservices, providing independent continuous integration and development lifecycle using the isolated context of the microservice.

9. The method of claim 8, wherein the single unified deployment artifact includes a discrete deployable artifact provided for each individual microservice of the plurality of microservices.

10. The method of claim 8, wherein the single unified deployment artifact includes a single executable artifact provided for all of the plurality of microservices.

11. The method of claim 8, wherein the isolated context is provided for each microservice of the plurality of microservices with a related configuration and objects.

12. The method of claim 8, wherein the isolated context provides database separation among the plurality of microservices.

13. The method of claim 8, wherein the isolated context enables elasticity for the plurality of microservices.

14. The method of claim 8, wherein in-process calls are used for communications between the plurality of microservices.

15. A system, comprising:

a non-transitory memory storing instructions; and one or more processors in communication with the non-transitory memory that execute the instructions to:

determine a plurality of microservices to be deployed to a sub-system;

deploy the plurality of microservices to the sub-system via a single unified deployment artifact, wherein the deployment of the plurality of microservices via the single unified deployment artifact causes:

installation of the plurality of microservices to the sub-system, and installation of required components of the plurality of microservices to the sub-system;

perform a startup of the sub-system having the plurality of microservices installed thereon;

upon startup of the sub-system, load each microservice of the plurality of microservices into an isolated context; and for each microservice of the plurality of microservices, provide independent continuous integration and development lifecycle using the isolated context of the microservice.

16. The system of claim 15, wherein in-process calls are used for communications between the plurality of microservices.

* * * * *